US006757542B2

(12) United States Patent
Bruin et al.

(10) Patent No.: US 6,757,542 B2
(45) Date of Patent: Jun. 29, 2004

(54) TOTAL RADIO NETWORK SOLUTION FOR GSM/EDGE

(75) Inventors: Peter de Bruin, Gammelstad (SE); Anders Furuskär, Stockholm (SE); Stephen Craig, Stockholm (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 21 days.

(21) Appl. No.: 10/231,239

(22) Filed: Aug. 30, 2002

(65) Prior Publication Data

US 2003/0060209 A1 Mar. 27, 2003

Related U.S. Application Data

(60) Provisional application No. 60/324,947, filed on Sep. 27, 2001.

(51) Int. Cl.[7] .................................................. H04Q 7/20
(52) U.S. Cl. .................... 455/453; 455/446; 455/452.1; 455/450
(58) Field of Search .............................. 455/453, 452.1, 455/562.1, 422.1, 446, 561, 450, 451, 452.2, 454, 522; 370/431, 437, 345, 328, 329, 337, 336; 375/132

(56) References Cited

U.S. PATENT DOCUMENTS

| | | | |
|---|---|---|---|
| 6,067,290 A | | 5/2000 | Paulraj et al. |
| 6,128,500 A | * | 10/2000 | Raghavan et al. ........... 455/453 |
| 6,418,327 B1 | * | 7/2002 | Carey et al. ............. 455/562.1 |
| 6,456,849 B1 | * | 9/2002 | Purnadi et al. ............. 455/453 |
| 6,611,506 B1 | * | 8/2003 | Huang et al. ............... 455/453 |
| 6,618,597 B1 | * | 9/2003 | Choi ........................ 455/522 |
| 2002/0102984 A1 | | 8/2002 | Furuskar et al. |

FOREIGN PATENT DOCUMENTS

| | | |
|---|---|---|
| EP | 862 299 A2 | 9/1998 |
| WO | WO 98/30047 A1 | 7/1998 |
| WO | WO 01/97537 A2 | 12/2001 |
| WO | WO 02/33848 A2 | 4/2002 |

OTHER PUBLICATIONS

Wigard, J., et al., *Capacity Of A GSM Network With Fractional Loading And Random Frequency Hopping*, Proceedings of IEEE PIMRC '96, May 1996, pp. 723–727.
Salmenkaita, M., et al., *A Practical DCA Implementation For GSM Networks: Dynamic Frequency And Channel Assignment*, Proceedings of IEEE VTC 2001 Spring, pp. 1–5.

* cited by examiner

*Primary Examiner*—Nay Maung
*Assistant Examiner*—John J Lee
(74) *Attorney, Agent, or Firm*—Burns, Doane, Swecker & Mathis, L.L.P.

(57) ABSTRACT

A method and apparatus for providing a high capacity radio communication network. The network employs a low frequency reuse technique between cells. The reuse technique renders the network interference limited, for example, by providing all cells in the network with the ability to allocate traffic channels on all frequencies assigned to the network for traffic channels. The reuse technique employed is Fractional Load Planning that can be extended to extreme capacities through Channel Allocation Tiering (CHAT). The radio resources in each cell are allocated using a Service Based Power Setting (SBPS) technique such that network capacity is maximized while allowing each service group to achieve its required quality of service (QoS) requirements. To limit the interference, thus maintaining/controlling the required QoS level for already admitted users, in the network a Power Based Admission Control (PBAC) technique is employed to control the admission of new users into the network.

20 Claims, 6 Drawing Sheets

TOTAL RADIO NETWORK SOLUTION FOR GSM/EDGE

This application claims priority to U.S. Provisional Application No. 60/324,947 entitled "Total Radio Network Solution for GSM/EDGE" filed on Sep. 27, 2001, the entire disclosure of which is herein expressly incorporated by reference.

BACKGROUND

The present invention relates to radio communication networks, and more specifically, to providing high capacity radio communication networks.

As the number of subscribers to radio communication networks increases, and their usage of these networks also increases, there is a need to increase the capacity of these radio communication networks. The capacity of a radio communication network is limited by the amount of radio resources allocated to individual coverage areas, known as cells, in the network. The amount of radio resources are determined by two factors, namely, the number of channels provided by, and the amount of interference in, the radio communication network.

When the capacity of a cell in a radio communication network is limited by the number of channels the cell is referred to as channel limited. It will be recognized that the number of frequencies employed by any particular radio communication network is limited to those allocated by government bodies. The use of these limited number of frequencies to create channels is determined by the particular access technique employed by the radio communication network. One popular access technique which is employed by networks which operate in accordance with the Global System for Mobile Communications (GSM) is a combination of Frequency Division Multiple Access (FDMA) and Time Division Multiple Access (TDMA). The FDMA/TMDA access technique allocates channels by dividing each frequency into a number of time slots. In GSM a voice channel is typically defined by one time slot per frame, a frame comprising eight time slots. A necessary condition for the use of channels in a cell is that there is equipment, e.g., transceivers, installed to enable the transmission and reception of the channels in question. Therefore, it can be seen that in a FDMA/TDMA system the number of channels allocated to a particular cell is limited by the number of frequencies allocated to the particular cell. If all channels in a particular cell have already been allocated, or if all installed transceivers are fully occupied, additional users are blocked from accessing the radio communication network from that cell.

To avoid channel limited situations, it would be desirable to allow all cells to operate on all frequencies. However, interference from proximately located cells limits the ability to assign all frequencies to each cell. For example, depending upon the amount of power employed, communications on a particular frequency in a particular cell will cause interference to communications on the particular frequency in a proximately located cell and to frequencies adjacent to the particular frequency both in the particular cell and in the proximately located cells. It will be recognized that cells can be considered to be proximately located if communications from one cell cause interference to communications in another cell. If the interference caused by communications on one frequency in a particular cell is strong enough, communications on the one frequency or on adjacent frequencies in proximately located cells may get dropped from the network. Even if the interference caused to communications on the one frequency or on adjacent frequencies in proximately located cells is not strong enough to cause these communications to be dropped from the network, the interference may be strong enough to cause an appreciable degradation in the Quality of Service (QoS) of the communications in the proximately located cells. When a cell has additional channels to allocate, but the channels themselves contain too much interference from other channels, or if the allocation of these additional channels will cause too much interference to channels which have already been allocated for communications, the inability to allocate the additional channels is referred to as an interference limited situation.

Figure 1:
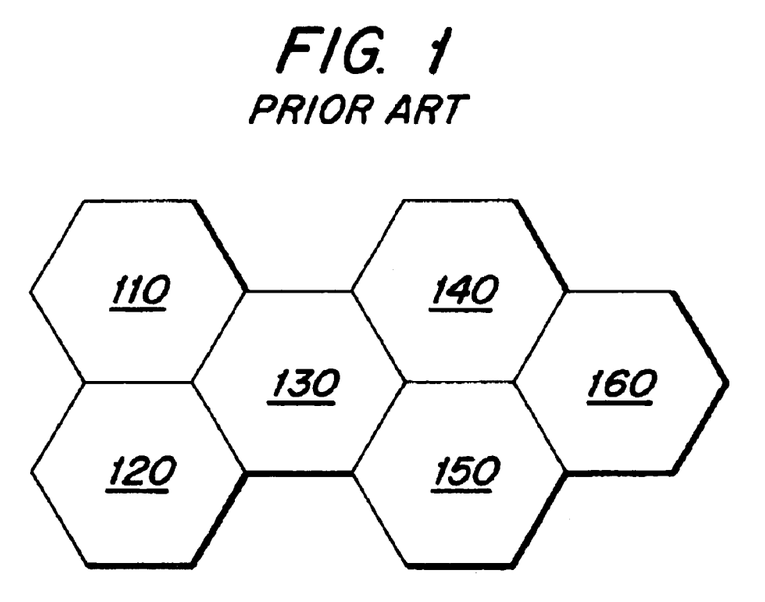
FIG. 1 illustrates a conventional radio communication network.

To limit interference, with the purpose of providing sufficient service quality, radio communication networks typically will assign different portions of the frequencies allocated to the radio communication network to proximately located cells. This is known as frequency reuse. FIG. 1 illustrates a ⅓ frequency reuse pattern. In FIG. 1 all frequencies allocated to the radio communication network are divided between cells 110, 120 and 130. Similarly, all frequencies allocated to the radio communication network are divided between cells 140, 150 and 160. Accordingly, cells 110, 120 and 130 are collectively referred to as frequency reuse group, herein referred to as frequency reuse group A. Similarly, cells 140, 150 and 160 are referred to as frequency reuse group, herein referred to as frequency reuse group B. To limit the amount of interference between frequency reuse groups, the particular set of frequencies assigned to a particular cell in a reuse group is selected such that it is the furthest from the particular set of frequencies in another reuse group. For example, in FIG. 1 cells 110 and 140, cells 120 and 150, and cells 130 and 160 would be assigned the same set of frequencies, respectively. However, by dividing the number of frequencies between cells in a reuse group, the number of channels in each cell is limited to less then the total number of channels which could be allocated if all frequencies were used in each cell. Another mechanism for limiting interference is to control the power of transmissions between users and the network. Accordingly, it should be recognized that transmission power can be considered as a component of the amount of radio resources which can be allocated by the network.

Conventional techniques for addressing the channel and interference limited situations focused on networks in which only one type of service is provided, for example, voice service. However, other types of services, for example, data, are being incorporated into radio communication networks. One standard for incorporating data communications in a GSM network is known as enhanced data-rates for GSM evolution (EDGE). A third generation (3G) network which incorporates EDGE with GSM is referred to as a GSM/EDGE Radio Access Network (GERAN). Data services can be defined by the particular characteristics of the type of data being conveyed, including streaming audio and video services, pure data, for example file transfers, and the like. These services all have different requirements for communication. Voice services are typically implemented in a circuit switched manner wherein an entire channel is reserved for the voice service. This is due to the requirement of voice services of low delay tolerance and low error tolerance. However, data services are typically more tolerant of delays and more tolerant of errors, and hence are implemented in a packet switched manner. The higher error tolerance of data services is due to the ability of these services to retransmit erroneously received data. The requirements for any particular service is known in the art as a QoS requirement.

One technique for achieving the differing QoS requirements for the different types of services is to designate certain frequencies for each different type of service. However, this can be a very inefficient use of radio resources. For example, if the channels allocated for data services are not fully used while the channels allocated for voice services are at capacity, the unused channels allocated for the data services result in a waste of radio resources which could be used for the voice services.

One attempt to increase capacity while still meeting the various QoS requirements in GERAN is referred to as Dynamic Frequency and Channel Assignment (DFCA). In Dynamic Frequency and Channel Assignment (DFCA), dynamic channel allocation is performed in an attempt to maintain the various QoS requirements for each service. The dynamic channel allocation is based on dynamic measurements, statistics and prediction. However, Dynamic Frequency and Channel Assignment (DFCA) results in a high degree of complexity to obtain the gain in network capacity due to the requirement that channel re-allocation must be performed frequently. In addition, Dynamic Frequency and Channel Assignment (DFCA) relies upon frequent measurements of the present radio quality which must be processed in the radio communication network. These frequent measurements must be combined with long-term statistics to make predictions of the most suitable channel for each requesting user. To avoid overloading the system, a "soft admission control" technique is utilized where users are not admitted into the system if the required radio channel cannot be provided. Moreover, Dynamic Frequency and Channel Assignment (DFCA) precludes the possibility of different services with different QoS requirements from sharing the same channel, i.e., packet switched access for different QoS requirements.

Accordingly, it would be desirable to increase the capacity of a radio communication network in view of the channel and interference limitations encountered when attempting to increase the capacity. It would also be desirable to achieve this increase of capacity in radio communication networks which support a variety of services. Further, it would be desirable to increase network capacity while still maintaining the required QoS for each service. It would also be desirable to increase network capacity without increasing the complexity of network planning. In addition, it would be desirable to increase network capacity while ensuring that the techniques employed do not prevent the introduction and the utilization of future improvements.

SUMMARY

The present invention provides methods and apparatus for providing a high capacity radio communication network. The network employs a low frequency reuse technique between cells. The reuse technique is selected such that the assignment of channels in each cell renders the network interference limited. The reuse technique employed is Fractional Load Planning (FLP) that can be extended to extreme capacities through Channel Allocation Tiering (CHAT). The radio resources in each cell are allocated using a Service Based Power Setting (SBPS) technique such that network capacity is maximized while allowing each service group to achieve its required quality of service (QoS) requirements. To limit the interference in the network, thus maintaining/controlling the required QoS level for already admitted users, a Power Based Admission Control (PBAC) technique is employed to control the admission of new users into the network.

BRIEF DESCRIPTION OF THE DRAWINGS

The objects and advantages of the invention will be understood by reading the following detailed description in conjunction with the drawings, in which.

DETAILED DESCRIPTION

The various features of the invention will now be described with reference to the figures, in which like parts are identified with the same reference characters.

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well known methods, devices, and circuits are omitted so as not to obscure the description of the present invention.

To achieve a high capacity network, the present invention employs a combination of techniques. Specifically, the present invention employs a combination of tight frequency reuse with Fractional Load Planning/Channel Allocation Tiering (FLP/CHAT), Service Based Power Control (SBPS) and Power Based Admission Control (PBAC). Although there are many individual techniques for increasing network capacity, Applicants have recognized that this combination of tight frequency reuse with FLP/CHAT, SBPS and PBAC shows synergistic properties. Specifically, with FLP, optionally extended with CHAT, it is possible to always guarantee interference limited operation, in which SBPS and PBAC work in their most advantageous environment.

To achieve a maximized overall spectral efficiency in the use of the allocated frequency spectrum it is desirable to employ a very tight frequency reuse, i.e., many, or all, of the frequencies allocated to a radio communication network are employed in all of the cells. The present invention employs Fractional Load Planning (FLP) which can be optionally extended to extreme capacities through Channel Allocation Tiering (CHAT), this combination herein being referred to as FLP/CHAT. In Fractional Load Planning (FLP) a tight reuse pattern, e.g., 1-reuse, is employed for the traffic channels in an entire radio communication network. To provide acceptable radio quality over the traffic channels, less than 100% of the allocated frequencies will be used in each cell, hence the denomination of the load planning as fractional. A maximum fractional load less than 100% is typically guaranteed by installing fewer transceivers than there are allocated frequencies in each cell. By increasing the number of transceivers and/or frequencies allocated per cell, more resources can be made available. If the ratio of transceivers to frequencies increases, however, more interference may be spread in the network.

To maximize interference diversity, and hence improve performance, random frequency hopping, preferably over a large number of frequencies, is employed. The frequency hopping can, optionally, be enhanced by employing mobile allocation index offset (MAIO) hopping to ensure full adjacent channel interference diversity within and between cells. The random frequency hopping statistically distributes the interference evenly over all the users, and hence, it can be said that all users experience the same interference level. If a 1-reuse pattern is employed in the network, different frequency hopping patterns will be employed in proximately located cells. If a lower than 1-reuse pattern is employed in the network through CHAT, different frequency hopping patterns will be employed in the different channel tiers of each cell.

Figure 2:
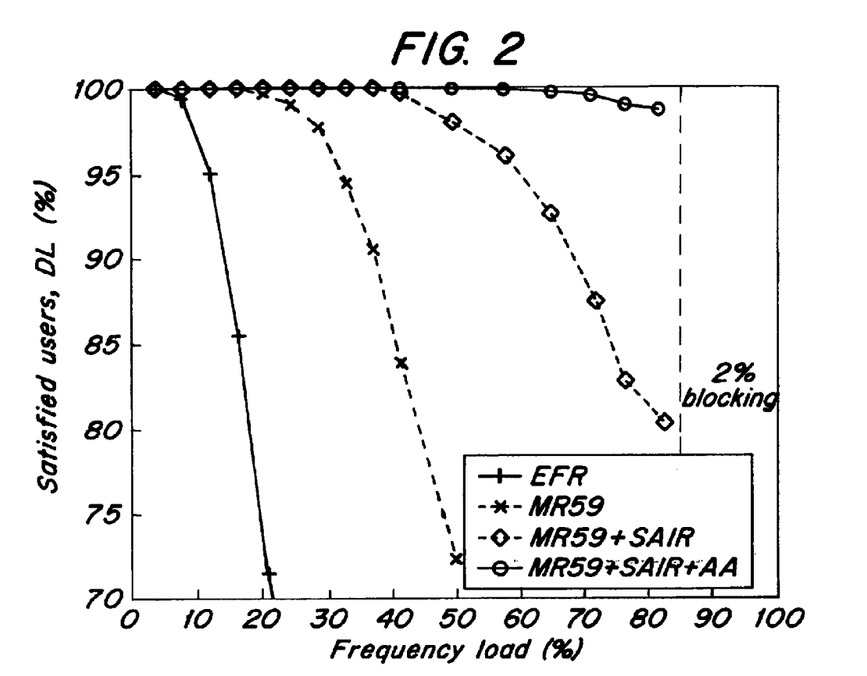
FIG. 2 illustrates the percentage of satisfied users versus the percentage of frequency load for a GSM network employing a variety of link level improvements.

It will be recognized that link level improvements may render even 1-reuse networks, such as Fractional Load Planning (FLP) networks, blocking limited within the near future. FIG. 2 illustrates this phenomenon. Specifically, FIG. 2 is a graph of the percent of satisfied users in the downlink versus the percentage of frequency load with various link level improvements. The solid line with hash marks along it represents the downlink performance with the enhanced full rate (EFR) voice codec; the dashed line with "x"'s along it illustrates the downlink performance with the multi-rate 59 full rate (MR59) voice codec; the dashed and dotted line with diamonds along it represents the downlink performance when employing MR59 and Single Antenna Interference Rejection (SAIR) in the downlink receivers; and the solid line with circles along it represents the downlink performance when employing MR59, SAIR and adaptive antennas (AA). The vertical line in FIG. 2 represents the frequency load at which the maximum acceptable blocking probability is reached, in this case 2%.

As illustrated in FIG. 2, by employing only EFR the percentage of satisfied users in the downlink decreases quite rapidly as the frequency load increases. With each additional link level improvement the number of satisfied users remains high for longer as the frequency load increases. With the combination of MR59, SAIR, and adaptive antennas (AA), the percentage of satisfied users in the downlink stays relatively high for high frequency loads to the extent that the blocking limit load is reached at around 98% satisfied users. Since a typical performance requirement in a cellular network may be that 95% of users should receive satisfactory quality, it is clear that, in terms of interference, more users could be admitted into the network if channels were available. If channels are not available, networks which employ this combination of link level improvements will be channel limited and not interference limited. To overcome this channel limited situation, the present invention employs Channel Allocation Tiering (CHAT).

Channel Allocation Tiering (CHAT) extends fractional load planning (FLP) to an even tighter frequency reuse than 1-reuse, i.e., a reuse less than 1 where frequencies are reused within a cell. To achieve a frequency reuse less than 1, Channel Allocation Tiering (CHAT) divides the transceiver resources in a cell into groups, so-called channel tiers, that partly or fully share the same radio resources, i.e., frequencies, allocated to the cell. To minimize interference between channel tiers, frequency hopping, adaptive antennas, interference suppression receivers, and/or enforced silence are employed in the present invention. For more information regarding Channel Allocation Tiering (CHAT), the interested reader should refer to U.S. patent application Ser. No. 09/818,341 entitled "Fractional Reuse Through Channel Tiering" filed Mar. 26, 2001, the entire disclosure of which is herein expressly incorporated by reference.

By employing the FLP/CHAT combination, the interference experienced by each user is statistically the same, and hence, the carrier-to-interference ratio (C/I) level is set by the received signal strength C. This is ideal for radio resource management algorithms such as the Service Based Power Setting (SBPS) and the Power Based Admission Control (PBAC) described below. In addition, since quality for a particular user is set by the C/I, any performance improvement or gain at the link level, e.g., by employing adaptive multi-rate voice modulators (AMR), interference rejection combining (IRC), or SAIR, can be directly translated into a capacity gain for the communication network. The C/I link gain means that more interference can be tolerated in the receivers, which in turn allows more users to be admitted into the network with retained QoS. Since the network is not channel limited, a system capacity gain is the direct result.

Since the interference experienced by each user is statistically the same, it follows that the interference experienced by each service group will be equal. Since the distribution of C/I for each service group will be determined by the received signal strength C, which in turn is determined by output power and the radio environment, it would be desirable to employ Service Based Power Setting (SBPS) to maximize capacity, (at least if users of different services are distributed in a similar manner). Service Based Power Setting (SBPS) is designed to provide the highest traffic load that can be supported while maintaining sufficient QoS for all service groups. This is achieved by balancing the power resources available between service groups so that the different QoS requirements of the different service groups are simultaneously reached. It should be noted that Service Based Power Setting (SBPS) is not regulating the received signal strength to a given target value, but instead, provides a statistically certain C (or C/I) to the whole service group by employing a power offset for the entire service group. This power offset employed by Service Based Power Setting (SBPS) can be applied to both services with fixed power and dynamically power regulated services. In the dynamically power regulated case the offset is applied to the maximum power. For example, Service Based Power Setting (SBPS) can provide a power offset of 4 dB between a power regulated voice service group and a fixed power data service group. Accordingly, maximum power of the individual mobile stations in the voice service group will be based off of this 4 dB offset.

Figure 3:
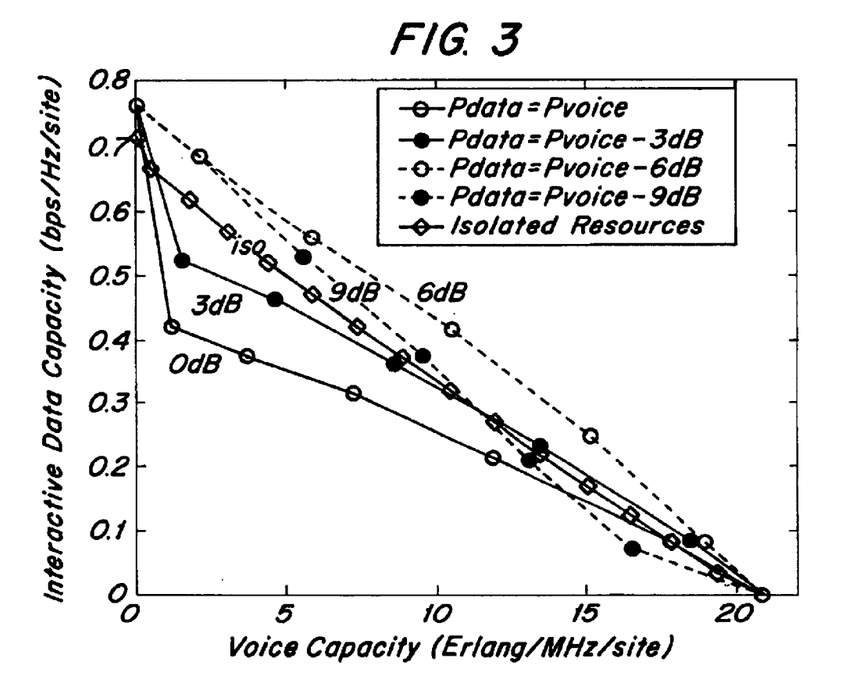
FIG. 3 illustrates the voice capacity versus the interactive data capacity for isolated resources, no fixed power offset, and a variety of fixed power offsets between the voice and data services.

FIG. 3 illustrates the application of Service Based Power Setting (SBPS) in a network which supports a voice service group and a data service group. Specifically, FIG. 3 represents the interactive data capacity versus the voice capacity with various radio resource allocations between voice and data service groups. In FIG. 3 an unbroken line with open circles along it represents employing no power offset between the voice and data service groups; an unbroken line with shaded circles represents a 3 dB power offset between the voice and data service groups; a dashed line with open circles represents a 6 dB power offset between the voice and data service groups; a dashed line with shaded circles represents a 9 dB power offset between the voice and data service groups; and a solid line with diamonds along the curve represents when the voice and data service groups use separate, i.e., isolated, resources.

In a network which supports circuit switched voice mixed with packet switched interactive users with a requirement of 10 kbps/time slot, a power offset of 6 dB between the voice and data service groups maximizes the network capacity. As illustrated by the curve representing the assignment of isolated resources between the voice and data service groups, network capacity will be less than that provided with the 6 dB power offset achieved by employing Service Based Power Setting (SBPS).

Figure 4A:
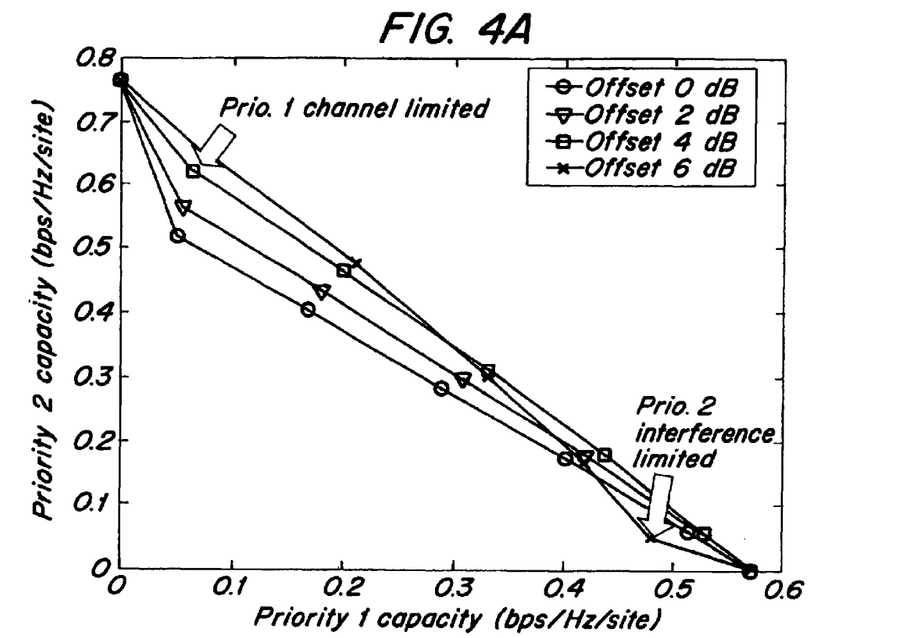
FIG. 4A illustrates the capacity of one type of service group versus a second type of service group without scheduling priority.

It should be recognized that it may not be possible to reach interference limited operation for all possible service mixes by employing a fixed power offset between service groups in accordance with Service Based Power Setting (SBPS). FIG. 4A is a graph illustrating the capacity of a service group with one priority level, Priority 1, versus the capacity for a second service group with a different priority level, Priority 2. Specifically, the service group Priority 1 is a packet switched service group with a requirement for 20 kbps/TS while service group Priority 2 is a packet switched service group with a requirement for 10 kbps/TS. In FIG. 4A the unbroken line with circles throughout it represents a 0 dB power offset between the service groups Priority 1 and Priority 2; the unbroken line with triangles throughout it represents a 2 dB power offset between the service groups Priority 1 and Priority 2; the unbroken line with squares throughout it represents a 4 dB power offset between the service groups Priority 1 and Priority 2; and the unbroken line with diagonal hash marks throughout it represents a 6 dB power offset between the service groups Priority 1 and Priority 2.

As illustrated in FIG. 4A, the greatest capacity for the network is achieved when either a 4 dB or a 6 dB power offset between service groups Priority 1 and Priority 2 is employed. However, as indicated in FIG. 4A, when a 4 dB power offset is employed between the service groups, there will be situations when service group Priority 1 will be channel limited. In addition, when a 6 dB power offset is employed between service groups, there will be situations when service group Priority 2 will be interference limited. Accordingly, to achieve the highest capacity for the network for these two service groups, it would be necessary to employ different power offsets between the service groups depending upon the capacity of the two service groups. However, providing different offsets between service groups depending upon the capacity of the service groups would unnecessarily complicate the network.

Figure 4B:
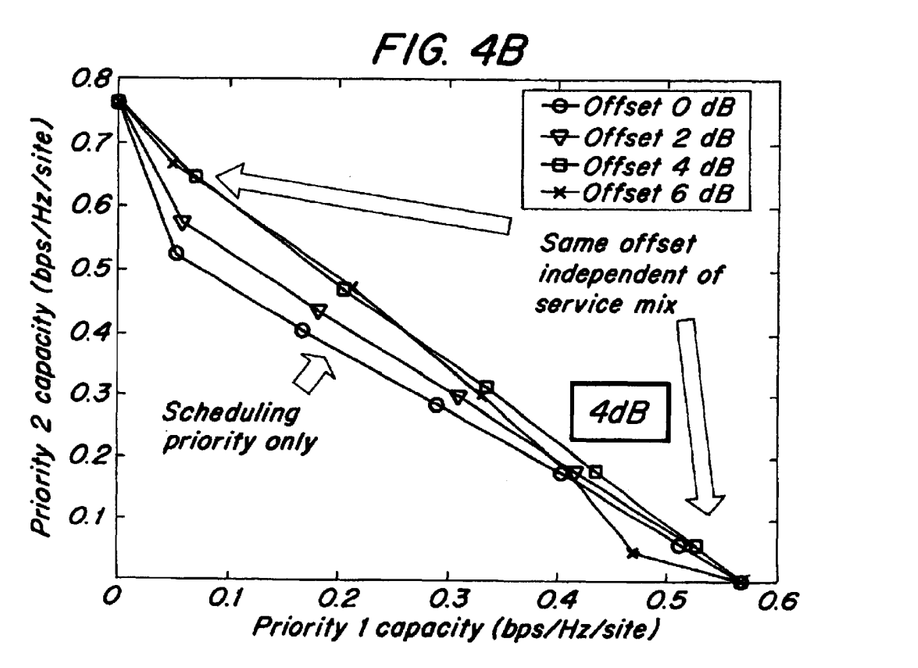
FIG. 4B illustrates the capacity of one type of service group versus a second type of service group with scheduling priority.

To achieve a fixed offset between two service groups independent of the capacity of each service group, the present invention can employ scheduling and/or channel reservation schemes to provide priority to specific user groups. FIG. 4B is a graph which illustrates the capacity of service group Priority 1 versus the capacity of service group Priority 2 in a network which employs scheduling priority. It will be recognized that scheduling priority refers to the sharing of the same channel, e.g., time slot, by multiple users where one or more users have a higher priority than other users and may utilize the channel more often. It will also be recognized that channel reservation is employed to distribute different users on the channels, i.e., the decision of which channels might be utilized, and possibly shared. The power offsets are represented by the same denotation as that described above in connection with FIG. 4A. As illustrated in FIG. 4B, with scheduling priority a 4 dB power offset between the service group Priority 1 and the service group Priority 2 results in the most efficient use of the networks capacity regardless of the service mix between service groups Priority 1 and Priority 2. For more information regarding Service Based Power Setting (SBPS), the interested reader should refer to U.S. patent application Ser. No. 09/899,242 "Method and Apparatus for Controlling Quality of Service for Multiple Services Through Power Setting" filed Jul. 6, 2001 by Furuskär et al., the entire disclosure of which is herein expressly incorporated by reference.

It should be recognized that in interference limited networks when traffic loads exceed the network capacity, user quality will degrade to unacceptable levels. It will be recognized that since the present invention targets interference limited scenarios rather than channel limited scenarios, that additional channels are typically available when the network capacity for interference is exceeded. To avoid these overloaded situations, the present invention employs an admission control scheme which limits the admitted traffic load to levels yielding acceptable quality for the admitted users. Conventional admission control schemes are often based on a maximum number of admitted users. Although these admission control schemes may be acceptable for a network which supports only one type of service, e.g., circuit-switched voice service, these admission control schemes do not maximize network capacity in networks which support multiple services. Specifically, in a network which supports multiple services, users of different services generate different amounts of interference, and the number of users that can be supported will vary with the service mix. Accordingly, an admission control scheme based upon a number of admitted users may admit too many, or too few, users due to the varying amount of interference caused by the different service groups.

To overcome the deficiencies of admission control schemes based upon a number of admitted users, the present invention employs a Power Based Admission Control (PBAC) scheme. The Power Based Admission Control (PBAC) scheme of the present invention will admit new users to the cell, or to a channel tier of the cell, only if a function of the total power currently employed in the cell, or in the channel tier, plus a function of the power which would be employed by the new user does not exceed a predetermined threshold. The predetermined threshold represents a function of the total amount of power used in a cell, or in a channel tier, above which there would be generated too much interference from the cell, or channel tier, such that communications QoS within the cell or channel tier, or in other cells or channel tiers, declines below an acceptable level.

Figure 5:
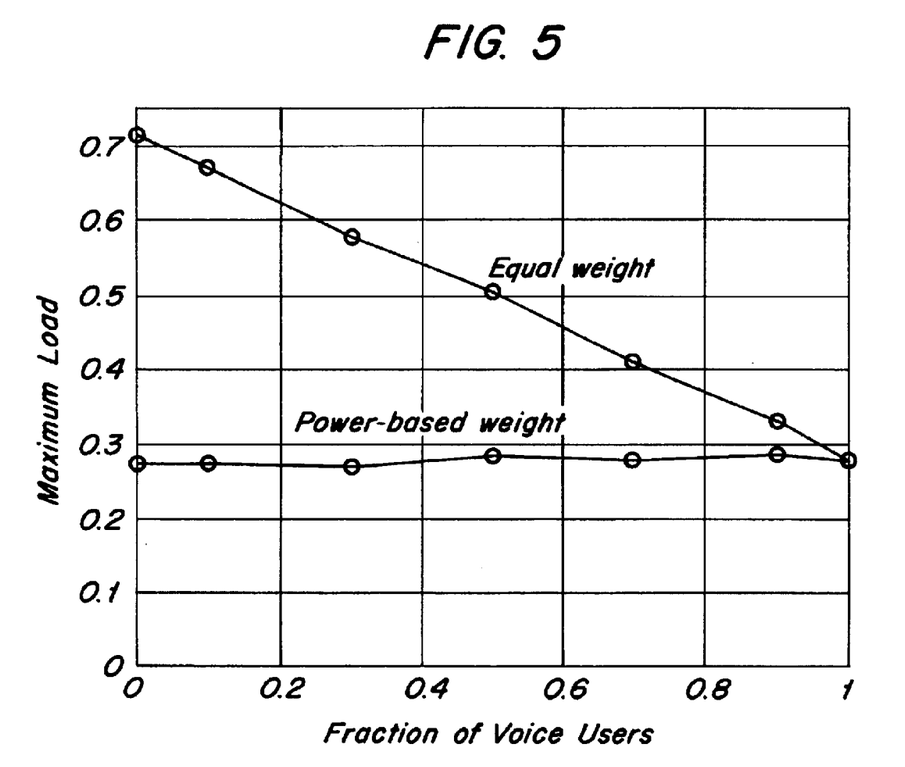
FIG. 5 illustrates the maximum load versus the fraction of voice users for Power Based Admission Control (PBAC) and for user based admission control.

FIG. 5 is a graph illustrating the fraction of voice users versus the maximum load of a network which employs admission control based upon the number of admitted users, wherein users of voice services and users of data services are counted equally, and a network which employs admission based control based upon the power employed by the service groups, wherein the power employed by the service groups is weighted based upon the actual amount of power allocated to the service groups. As illustrated in FIG. 5, with equal user weights, the maximum load of the network will vary with the service mix. In this case, this variance is due to the ability of this network to sustain higher data-only loads than a voice-only load. However, when the users are weighted based upon their output power when determining the network load, the resulting load measure is largely independent of the service mix.

Figure 6A:
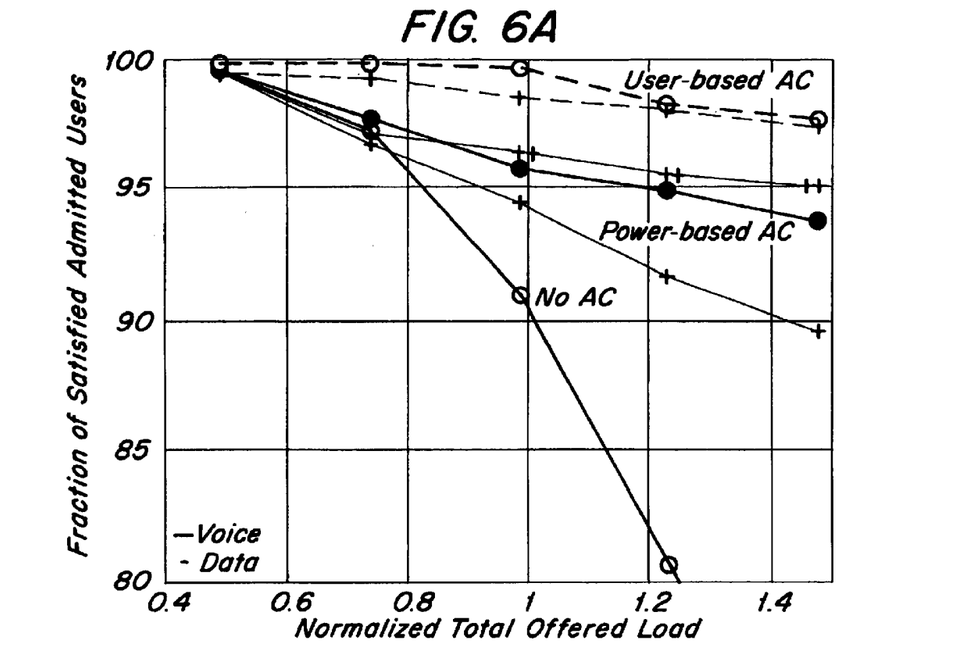
FIG. 6A illustrates the fraction of satisfied admitted users versus the normalized total offered load for networks which employ no admission control, Power Based Admission Control (PBAC) and user based admission control.
Figure 6B:
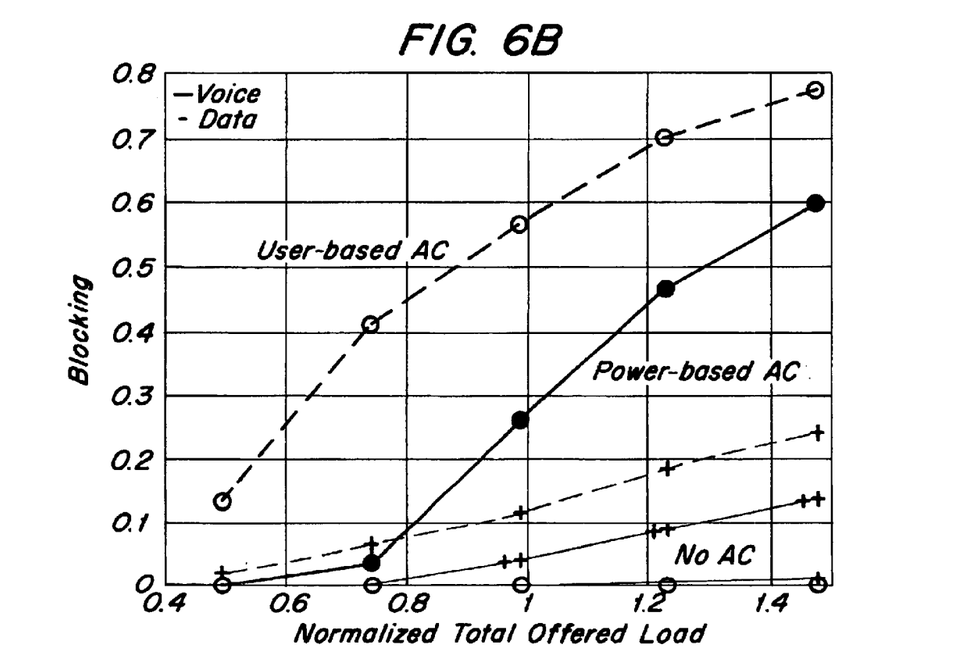
FIG. 6B illustrates the blocking rate versus the normalized total offered load for networks which employ no admission control, Power Based Admission Control (PBAC) and user based admission control.

A further illustration of the advantages of Power Based Admission Control (PBAC) will now be described in connection with FIGS. 6A and 6B. FIGS. 6A and 6B respectively illustrate the fraction of satisfied admitted users and the amount of blocking versus the normalized total offered load. The normalized offered load (NOL) is defined as:

$$NOL = v/V + d/D,$$

wherein v and d are the offered voice and data traffic loads respectively, and V and D are the maximum sustainable voice and data traffic loads for acceptable quality in single service networks. A network which preserves relative capacities in mixed service networks has a capacity limit of NOL=1, and hence, it will be recognized that when NOL=2 at least 50% blocking is required to preserve acceptable quality for admitted users.

In FIGS. 6A and 6B the thin lines with plus signs along them represents voice services while the thick lines with circles along them represent data services. Specifically, the thin unbroken line with plus signs along it, and the thick unbroken line with open circles along it, represent voice services and data services in a network with no admission control (NoAC), respectively; the thin unbroken line with double plus signs along it, and the thick unbroken line with shaded circles along it, represent voice services and data services in a network with power-based admission control (Power-based AC), respectively; and the thin dashed line with plus signs along it, and the thick dashed line with open circles along it, represent voice services and data services in a network with user-based admission control (User-based AC), i.e., admission control based on the number of users, respectively. As illustrated in FIG. 6A, Power Based Admission Control (Power-based AC) provides a greater fraction of satisfied users as the normalized total offered load increases as compared to a network which does not employ admission control (No AC). However, a user-based admission control network will provide a higher fraction of satisfied admitted users compared to a Power Based Admission Control (Power-based AC) network.

Referring now to FIG. 6B, the user-based admission has a higher blocking rate compared to a Power Based Admission Control (PBAC) network as the normalized total offered load increases. Comparing FIGS. 6A and 6B it can be seen that the higher fraction of satisfied users achieved by a user-based admission control (User-based AC) network is achieved at the cost of a higher blocking rate compared to a Power Based Admission Control (Power-based AC) network. This higher blocking rate of user-based admission control (User-based AC) is due to the dimensioning of this network to account for the worst case power output of any service group, thereby overestimating the actual interference caused by a particular user. In addition, the lower blocking rate of a Power Based Admission Control (PBAC) network can still obtain the required 95% of satisfied voice users and 90% satisfied data users at a normalized total offered load several times higher than 1. Note that through the use of different power thresholds, PBAC can be parameterized for any targeted fraction of satisfied users. For more information relating to Service Based Power Setting (SBPS) and Power Based Admission Control (PBAC), the interested reader should refer to U.S. patent application Ser. No. 09/899,242 entitled "Method and Apparatus for Controlling Quality of Service for Multiple Services Through Power Setting" filed on Feb. 1, 2001, the entire disclosure of which is herein expressly incorporated by reference.

Figure 7:
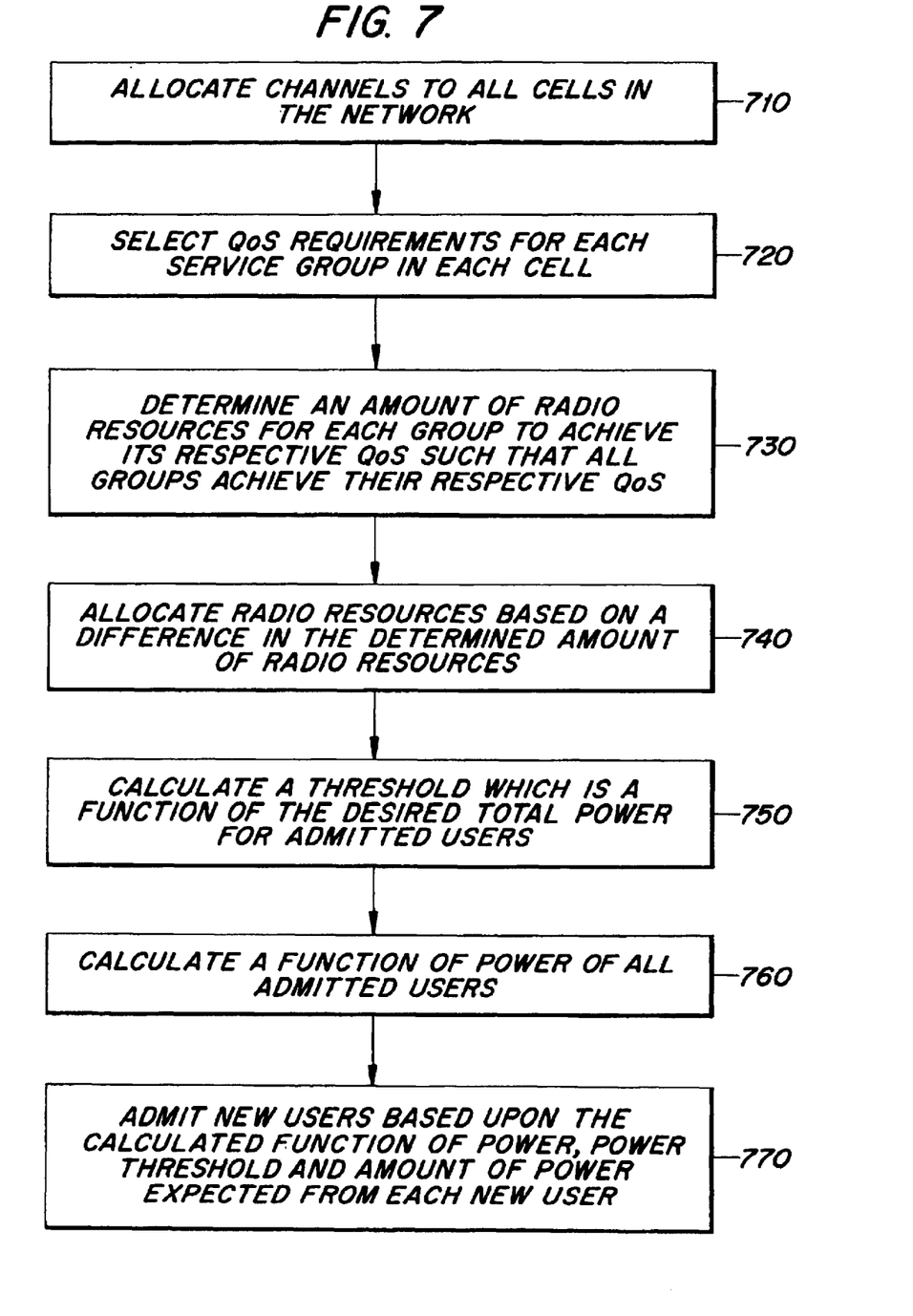
FIG. 7 illustrates a method for providing a high capacity network in accordance with exemplary embodiments of the present invention.

Now that an overview of the exemplary components of the present invention have been presented, a description of the implementation of these components in a radio communication network will be described in connection with FIG. 7. Initially, the network allocates the channels to all of the cells of the network (step 710). This allocation will include the FLP/CHAT techniques of low frequency reuse, and in accordance with one embodiment of the present invention this allocation will result in all frequencies available for assignment by the network, after allocation of Broadcast Control Channel (BCCH) frequencies, as traffic channels to be allocated in each cell or channel tier. Since the present invention is designed to produce an interference limited network rather than a channel limited network, the channel allocation is performed such that more channels are allocated to each base station than can be employed due to network interference. One skilled in the art will recognize how to allocate channels to render a system interference limited, e.g., by employing a computer modeling program. After the channels have been allocated, a QoS for each service group is selected in each cell (step 720). An amount of radio resources required for each service group in each cell to achieve the selected QoS is determined such that all service groups achieve the respective QoS (step 730). The radio resources are then allocated based on the difference between the determined amount of radio resources (step 740). The allocation of radio resources is performed by providing a fixed power offset between service groups as described above. Steps 720–740 represent the Service Based Power Setting (SBPS) technique described above. Next a threshold level of a function of the total power is determined (step 750). The threshold level is set such that if the threshold were exceeded the admitted users to suffer an unacceptable degradation in QoS. A function of the power currently employed by admitted users in the cell is determined (step 760). New users are then admitted based upon the determined function of power employed by admitted users and the determined threshold level of power (step 770). Steps 750–770 represent the Power Based Admission Control (PBAC) technique described above.

It should be recognized that the combination of tight frequency reuse, SBPS and PBAC is selected due to Applicants recognition that these techniques shows synergistic properties. Specifically, with FLP, optionally extended with CHAT, it is possible to always guarantee interference limited operation, in which SBPS and PBAC work in their most advantageous environment. However, many techniques for increasing network capacity are typically not additive. For example, a combination of FLP/CHAT, SBPS and user based admission control does not achieve the spectrally efficiency required to achieve the high network capacity of the present invention because user based admission control is service mix dependent and networks must be conservatively dimensioned to account for a worst case service mix.

Although the present invention has been described in connection with a GSM/EDGE networks which communicates using an FDMA/TMDA access technique, the present invention can be applicable to other types of radio communication networks and other types of access techniques.

The invention has been described herein with reference to particular embodiments. However, it will be readily apparent to those skilled in the art that it may be possible to embody the invention in specific forms other than those described above. This may be done without departing from the spirit of the invention. Embodiments described above are merely illustrative and should not be considered restrictive in any way. The scope of the invention is given by the appended claims, rather than the preceding description, and all variations and equivalents which fall within the range of the claims are intended to be embraced therein.

What is claimed is:

1. A method for maximizing capacity in a radio communication network comprising the steps of:
    allocating a set of channels to each base station in the radio communication network, wherein each set of channels comprises more channels than can be employed for communication due to network interference, and wherein each base station has an associated coverage area;
    selecting a service quality requirement for a first service group and a second service group for each base station in the radio communication network;
    determining an amount of radio resources for the first and second service groups to achieve the respective service quality requirement;
    allocating the radio resources between the first and second service groups based on a difference between the determined amount of radio resources, wherein the radio resources are allocated per bearer within the first and second service groups, wherein the radio resources are allocated at least from the set of channels;
    calculating a function of the power for all users in each coverage area associated with each base station; and
    admitting new users to the coverage area associated with one of the base stations if the calculated function is less than a predetermined threshold.

2. The method of claim 1, wherein the channels comprise a combination of at least one frequency and at least one time slot.

3. The method of claim 2, further comprising the steps of:
    communicating between the base stations in each group and the users therein using frequency hopping sequences over the same set of frequencies.

4. The method of claim 3, wherein the frequency hopping sequences for proximately located base stations in each group are different.

5. The method of claim 4, wherein the base stations in each group are proximately located if their communications result in more than a predetermined amount of interference with each other.

6. The method of claim 1, wherein each base station includes a first transceiver and a first antenna associated with a first channel tier, and a second transceiver and a second antenna associated with a second channel tier, wherein the first and second transceivers partly or fully share the same set of channels.

7. The method of claim 6, wherein each channel comprises at least one frequency and at least one time slot, and wherein the first and second transceivers communicate using different frequency hopping sequences.

8. The method of claim 1, further comprising the steps of:
    dividing transceiver resources of each base station into channel tiers, wherein each channel tier partly or fully shares the same radio resources, whereby the amount of radio resources allocated between the first and second service groups is increased by the division of transceiver resources.

9. The method of claim 1, wherein the network employs scheduling priority for allowing users of each service group, already admitted into the coverage area, access to the channels.

10. The method of claim 1, wherein the allocated radio resources further comprises transmission power.

11. A method for maximizing capacity in a radio communication network comprising the steps of:
    allocating a set of channels for use as traffic channels to each base station in the radio communication network, wherein the channels are allocated such that the network is interference limited;
    selecting a service quality requirement for a first service group and a second service group;
    determining an amount of radio resources for the first and second service groups to achieve the respective service quality requirement;
    allocating the radio resources between the first and second service groups based on a difference between the determined amount of radio resources, wherein the radio resources is an amount of power, wherein the radio resources are allocated at least from the set of channels;
    calculating the total amount of radio resources employed by the first and second service groups; and
    allocating radio resources to a new user to the radio communication network if the total amount of radio resources is less than a predetermined threshold.

12. The method of claim 11, wherein each channel comprises at least one frequency and at least one time slot.

13. The method of claim 11, further comprising the steps of:
    communicating between the base stations and users in the radio communication network using frequency hopping sequences over the same set of frequencies.

14. The method of claim 13, wherein the frequency hopping sequence for proximately located base stations is different.

15. The method of claim 14, wherein base stations are proximately located if their communications result in more than a predetermined amount of interference with each other.

16. The method of claim 11, further comprising the steps of:
    dividing transceiver resources of each base station into channel tiers, wherein each channel tier partly or fully shares the same radio resources, whereby the amount of radio resources allocated between the first and second service groups is increased by the division of transceiver resources.

17. A method for maximizing capacity in a radio communication network comprising the steps of:
    selecting a service quality requirement for a first service group and a second service group for each channel tier of each base station in the radio communication network;
    determining an amount of radio resources for the first and second service groups to achieve the respective service quality requirement;
    allocating the radio resources between the first and second service groups based on a difference between the determined amount of radio resources, wherein the radio resources are allocated per bearer within the first and second service groups;
    calculating a function of the power for all users in each channel tier; and
    admitting new users to each sector if the calculated function is less than a predetermined threshold.

18. The method of claim 17, further comprising the steps of:

communicating between the base station and users in the radio communication network using frequency hopping sequences over the same set of frequencies.

19. The method of claim 18, wherein the frequency hopping sequence for each channel tier of the base station is different.

20. A method for maximizing capacity in a radio communication network comprising the steps of:

allocating a set of channels to a first and second base station in the radio communication network, wherein the first and second base stations are allocated more channels than can be employed for communications due to network interference;

dividing the set of channels into at least two channel tiers for the first and second base stations, wherein each channel tier of the at least two channel tiers of the first base station partially shares channels with other channel tiers of the at least two channel tiers of the first base station;

determining an amount of radio resources for a first and second service group to achieve a predetermined service quality requirement for each of the first and second service groups; and allocating the radio resources between the first and second service groups based on a difference between the determined amount of radio resources between the determined amount of radio resources, wherein the radio resources are allocated per bearer within the first and second service groups, and wherein the radio resources are allocated at least from the set of channels.

* * * * *